Aug. 5, 1924.
F. C. ATWOOD
1,504,013
INSTRUMENT FOR WITHDRAWING BLOOD FROM ANIMALS
Filed Dec. 5, 1922
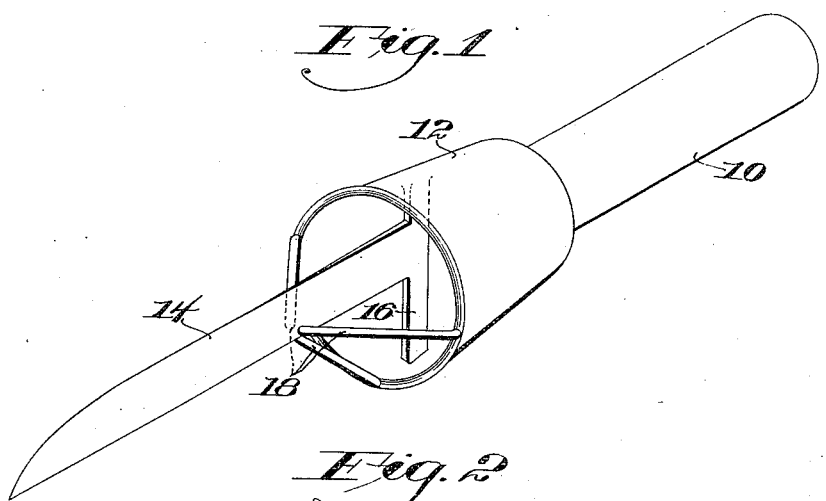
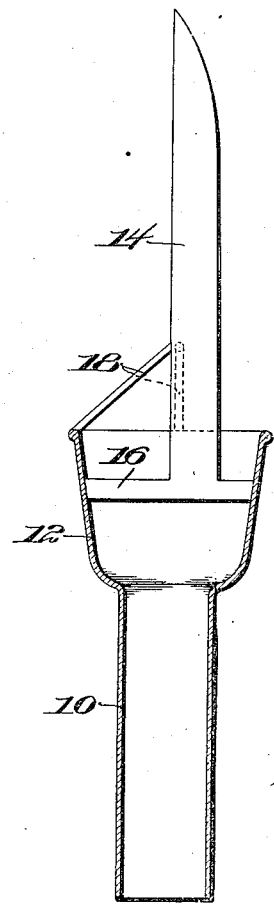

Patented Aug. 5, 1924.

1,504,013

UNITED STATES PATENT OFFICE.

FRANCIS CLARKE ATWOOD, OF NEWTON, MASSACHUSETTS, ASSIGNOR TO AMERICAN PROTEIN CORPORATION, OF BOSTON, MASSACHUSETTS, A CORPORATION OF MASSACHUSETTS.

INSTRUMENT FOR WITHDRAWING BLOOD FROM ANIMALS.

Application filed December 5, 1922. Serial No. 605,091.

*To all whom it may concern:*

Be it known that I, FRANCIS CLARKE ATWOOD, a citizen of the United States, residing at Newton, in the county of Middlesex and State of Massachusetts, have invented certain new and useful Improvements in Instruments for Withdrawing Blood from Animals; and I do hereby declare the following to be a full, clear, and exact description of the invention, such as will enable others skilled in the art to which it appertains to make and use the same.

This invention relates to an instrument for use in withdrawing blood from food animals at the time of their slaughter.

One object of the invention is to provide a novel instrument for use in withdrawing blood from food animals at the time of their slaughter in a simple, practical and such a clean and sanitary manner as to permit its use as a basis for food products.

A further object of the invention is to provide a novel and improved instrument which may be used for both the slaughter of food animals and withdrawing their blood without interference in any way with the usual slaughtering routine of a modern slaughterhouse and at the same time to permit collection of the bood in such a clean and sanitary manner as to permit its use as the basis of food products.

With these objects in view the invention consists in the instrument hereinafter described and particularly defined in the claims.

In the drawing Figs. 1 and 2 represent the instrument in perspective and vertical section, respectively.

The slaughter of animals for commercial food purposes is a very large industry and, because of its size, complexity and low margin of profits, all operations and steps connected with the slaughter of food animals must be exceedingly simple, easy of accomplishment and speedy in execution. Present methods of slaughter are the result of a very gradual development over long periods of time, and it is unlikely that there will be any revolutionary changes in these methods. Certain it is that any process for rendering the proteins of blood available as foods must fit in with present slaughtering methods and not interfere in any way with present practice. Moreover, the laws of all civilized countries, and more particularly the United States, are becoming increasingly drastic in regard to the production of meat foods and meat food products. Any protein foods or food bases derived from blood must satisfy rigid government inspection. One Federal regulation provides that "no blood which comes in contact with the outside of the animal shall be used for food purposes." The valuable and nutritious properties of the proteins occurring as constituents of animal blood have been recognized for some time by those who have searched for new foods. Small amounts of whole blood are occasionally used in articles of food such as blood pudding, blood sausage and blood bread, but only in foods which are subjected to very thorough sterilization by cooking before use.

In order to facilitate an understanding of the various conditions attending the use of an instrument of the present character in a modern slaughterhouse, the present slaughtering practice is briefly described as follows: The cattle, after arrival at the slaughterhouse, are usually permitted to rest over night in suitable pens and are driven the next morning through inclined runways to the killing pens located adjacent to the killing floor of the slaughterhouse, the latter usually being located at the top of the slaughterhouse. After the animals have been stunned by a blow in the middle of the forehead, and after they have been hoisted on an overhead trolley or rail, the animals are moved out on to the killing floor to the butchering position. At the present time long butchering knives are used, the point of each being inserted into the neck of the animal as it hangs head down, in such a manner that when the knife is completely inserted and a cut upwardly is made, the main blood channels or arteries are severed near the so-called jugular bifurcation. The operator then withdraws the knife and the blood gushes forth from the cut in a large stream. Considerable skill is required in making an accurate cut and one from which the blood will flow freely so that the major part of the blood will have drained from the animal within a very short time, in general not over a minute. Because of the high development of the by-product end of the packing house business in which practically every available portion of the animal is utilized, it is necessary that the sticking operation be conducted in the above outlined manner in order that by-products may not be rendered unfit for their use. For example, if a cut is not correctly made through the hide, this spoils to some extent the selling value of the hide. It is also possible that a careless cut will puncture or sever the gullet or windpipe. This, in addition to interfering with the free flow of blood, destroys the inner lining of the windpipe, commonly called the "weasand," which at present is sold for sausage casing. It is also possible for a careless cut to penetrate in such a way as to permit some of the blood to flow into the abdomen and other cavities, and if free draining is not possible from these cavities, so-called "bloody necks" or "bloody shoulders" are the result. It is, therefore, to be observed that the correct sticking operation necessitates considerable skill and is important from an economic point of view.

The present instrument is designed to accomplish the withdrawal and permit the collection of the blood from an animal, after the main blood vessels have been severed, in a manner such that the blood may be used as a basis for food products possessing a high degree of cleanliness, sterility and other qualities; and in any event, in a manner such that the blood may be free from contamination by contact with the outside of the hide or skin of the animal or by any drippage from the animal or from other sources.

In general the present invention contemplates an instrument of the general size, balance and convenience of the ordinary butchering knife, and which comprises essentially a conduit of a convenient size to grasp, and at the same time of a size sufficient to permit substantially complete drainage of the blood from the animal during the interval that the animal is moving from "butchering" to "heading" position upon the slaughterhouse floor, so that the use of the instrument interferes in no way with the ordinary routine operation of the slaughterhouse. Provision is made for directing the blood stream from the interior of the wound into and through the conduit, preferably by means of a cup or enlargement supported upon one end of the conduit, and of a sufficient size to catch and enclose the gush of blood from the interior of the wound and to direct it into and through the conduit. In the embodiment of the invention designed for use in sticking the animals, as well as in withdrawing their blood, a knife blade is supported upon the cup end of the instrument. The size of the knife blade and conduit is such that the entire instrument possesses the balance and general convenience of the ordinary butchering knife at present used.

Referring to the drawing illustrating the preferred embodiment of the invention, the instrument comprises a conduit 10 of a size such that it may be conveniently grasped in a manner similar to the ordinary butcher knife and having a cup 12 upon one end thereof within which a blade 14, preferably of an effective blade length of from 5 to 8 inches, is firmly supported by a cross-bar 16 secured to the inside of the cup 12 back of the edge. Small supporting rods 18 extend from the edge of or from within the cup to the back portion of the blade. The length of the combined conduit and blade is approximately that of the usual butchering knife at present employed in the slaughtering of the animals. This construction of instrument is simple and yet extremely efficient.

In use, the instrument is grasped firmly by the handle 10 and a preliminary slit is made in the hide of the animal at the throat of a length anywhere from 4 to 8 inches. This gives a fairly open wound and in general any contamination which may have attached to the blade when cutting the hide is wiped off by the soft inside folds of the wound. The knife is then carefully placed in the wound and a second cut is made by directing the blade straight into and toward the jugular bifurcation and the customary cuts of arteries and veins are made to allow for very free bleeding. When this second cut occurs the blade is usually well embedded in the second cut and the tapered supporting rods 18 are well inside the first cut and operate to spread the edges of the cut apart, so that as the blood stream gushes forth it is directed by capillarity along the knife blade directly into the interior of the bowl or cup and thence through the conduit where it emerges in a definite stream and may be easily caught in a receptacle held in a convenient position. In order to assist in insuring the passage of the entire blood stream through the cup, the knife blade is spaced from the lips of the cup so that as the blood stream flows down the knife blade it is maintained out of actual contact with the lips of the cup and the flowing thereof over the lips of the cup is avoided. This result may be conveniently accomplished by making the knife blade of a width relatively small compared to the width of the cup. In this way there is practically no chance for contamination because the blood cannot come in contact with the outside part of the hide and very little ever comes in contact with the outside part of the first cut. By holding the cup against the wound, the lips of the wound are maintained in a divergent position and the cup thus effectively prevents the loss of blood. The supports for the blade are so positioned as to spread the wound made by the blade and thereby prevent possible contamination when the blood flows from the wound into the cup, the mouth of the wound being spread to an opening at least as large as the mouth of the cup so that nothing may enter the cup except from the wound. The blade may serve not only as the cutting part of the instrument but where the blood flow wets the blade it is attracted to the surface of the blade by capillarity and, therefore, the blade if properly supported in relation to the cup will direct the flow of blood into the cup. This latter use of the blade is quite important for the capillary effects and if not recognized and used may destroy the efficient use of the knife as a whole by directing the blood to the outside as well as to the inside of the cup.

In accordance with the usual butchering practice, the wound or incision is made with the edge of the blade directed upwardly and in order to afford additional opportunity for the blood stream as it runs down the knife blade from the wound to flow into the cup, the knife blade is positioned slightly offset from the center of the cup, as shown in Fig. 2. With this arrangement considerable space is left between the rear edge or back of the knife blade and the walls of the cup.

It will be observed that the use of an instrument embodying the present invention substantially prevents a contamination of the blood, because the blood is protected from contact with the outside of the hide of the animal. Furthermore, the blood from each animal may be collected within a very short period of time, usually not over thirty seconds, during the butchering of the animal and the course of its movement to the next dressing station, namely the heading station, so that the use of the knife causes no more inconvenience than the ordinary butchering knife and in no way interferes with the usual routine of handling and dressing the cattle upon the killing floor of the slaughterhouse. In addition, the use of the present instrument permits collection of the blood from substantially all of the animals in sequence. As far as I am aware it is impossible to do this by any of the known methods for collecting blood, except those methods which, of necessity, allow the blood to become grossly contaminated and rendered unfit for food purposes. Such contaminations always cause a certain destruction of the blood corpuscles, so that any product derived from the blood are distinctly red in color. It is quite important from an economic point of view that the present instrument does not spoil the selling value of any of the above mentioned by-products, nor is it any more likely to cause "bloody shoulders" and "bloody necks" than the use of the common butchering knife. It will also be observed that the present construction of instrument is such as to lend itself readily to cleansing and sterilization. In practice at times when the animals are wet or are suspected to be diseased the knife must be so cleansed and sterilized after each killing. As a single operator will frequently have to kill sixty animals an hour, it is important that the cleansing and sterilization be accomplished in a minimum time in order to avoid the necessity of a large number of knives.

While the preferred embodiment of the invention has been illustrated and described, it will be understood that the invention may be embodied in other forms within the scope of the following claims.

Having thus described the invention, what is claimed is:—

1. An instrument for withdrawing blood in such condition as to permit its use as a basis of food products from a food animal during its slaughter, comprising a hollow handle having an enlargement at one end thereof for directing the blood stream from the usual wound into and through the handle and having means attached to the enlargement for spreading the wound.

2. An instrument for withdrawing blood from food animals during slaughter comprising a tubular handle providing a conduit for the flow of blood therethrough, a transverse support rigidly connected to the inside of the handle below the upper edge and projecting across the conduit, and a knife blade projecting upwardly from the support and spaced away from the interior walls of the handle.

3. An instrument for withdrawing blood in such condition as to permit its use as a basis of food products from a food animal during its slaughter, comprising a hollow handle provided with an enlargement at one end thereof, and a knife blade projecting from within the enlargement and of a width less than the width of the enlargement.

4. An instrument for withdrawing blood in such condition as to permit its use as a basis of food products from a food animal during its slaughter, comprising a hollow handle provided with an enlargement at one end thereof, and a knife blade projecting from within the enlargement, the edges of the knife blade being spaced from the lips of the enlargement.

5. An instrument for withdrawing blood in such condition as to permit its use as a basis of food products from a food animal during its slaughter, comprising a hollow handle provided with an enlargement at one end thereof and a knife blade projecting from within the enlargement, and a plurality of rigid legs for supporting the knife blade from the enlargement, the width of the knife blade being less than the width of the enlargement.

6. An instrument for withdrawing blood from food animals during slaughter comprising a hollow handle providing a conduit for the flow of blood therethrough, a relatively thin knife blade extending downwardly within the handle, and supporting means located below the upper edge of the handle for connecting the lower end of the knife blade to the handle.

7. An instrument for withdrawing blood from food animals during slaughter comprising a hollow handle providing a conduit for the flow of blood therethrough and having an annular rim designed to engage with the wound, a knife blade extending within the handle and connected to the latter back of the annular rim in such a manner that blood flowing along the blade is directed into the hollow handle inside of the rim.

8. An instrument for withdrawing blood from food animals comprising a hollow handle, a cup shaped enlargement at the forward end of the handle having an annular rim for engagement with the wound, a knife blade extending within the enlargement and connected thereto back of the rim, and spreading members of relatively small cross section extending diagonally from the knife blade to the rim, whereby the major portion of the blood flowing along the knife blade by capillarity is directed without substantially impeding its flow into the cup shaped enlargement.

9. An instrument for withdrawing blood from food animals during slaughter comprising a hollow handle, a knife blade projecting from the upper end of the handle and connected thereto in such a manner that substantially all of the blood flowing along the knife blade by capillarity is directed into and through the handle.

10. An instrument of the class described comprising a hollow handle having a rim at its forward end for engagement with the wound, a knife blade extending from within the handle and designed to direct blood into the handle, and means for spreading the mouth of the wound to approximately the size of the front portion of the handle.

11. An instrument for withdrawing blood from food animals during slaughter comprising a hollow handle having a cup shaped enlargement at its front portion and a flat and relatively thin knife blade connected to the inside of the cup shaped enlargement below the edge.

12. An instrument for withdrawing blood from food animals during slaughter comprising a hollow handle having a cup shaped enlargement at its front portion, a flat and relatively thin knife blade connected to the inside of the cup shaped enlargement below the edge, and a plurality of diagonal legs of relatively small cross section extending from the knife blade to the outer portion of the cup shaped enlargement to brace the blade and spread the wound or incision.

FRANCIS CLARKE ATWOOD.

Witnesses:
WILLIAM BENTON WESCOTT,
HORACE VAN EVEREN.